United States Patent Office 2,954,275
Patented Sept. 27, 1960

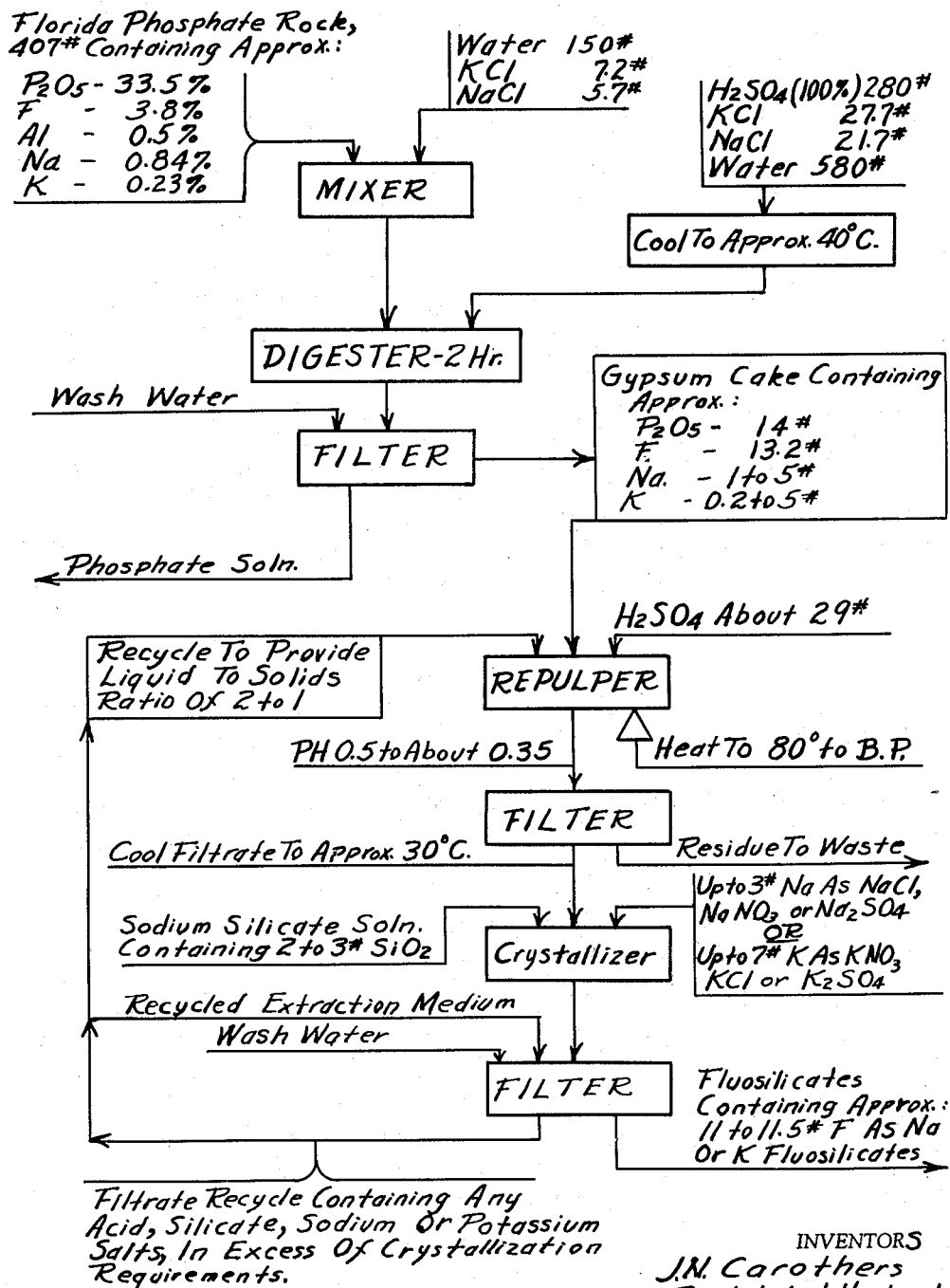

2,954,275
PROCESS OF RECOVERING FLUORINE FROM PHOSPHATE ROCK

John N. Carothers and Rudolph J. Hurka, Jr., both of 1629 Lady Marion Lane NE., Atlanta, Ga.

Filed Jan. 15, 1958, Ser. No. 709,011

5 Claims. (Cl. 23—88)

This invention relates to a process for the recovery of fluorine from phosphate rock in which the phosphate values are first recovered substantially free of fluorine, leaving a solids residue containing the major portion of the fluorine originally in the rock from which the fluorine is extracted.

An object of our invention is to provide a process of the character designated in which the phosphate content of high grade Florida land pebble phosphate rock is largely brought into solution by means of a sulfuric acid solution in such proportion as to render the greater proportion of the $P_2O_5$ content of the rock water soluble and form a phosphate solution, and in the presence of a substance which represses the solubility of the fluorine content of the rock, thus forming a low fluorine phosphate solution and leaving the major portion of the fluorine in the solids residue, and then, after separating the solids from the solution, extracting the fluorine content of the rock from the solids residue.

Another object of our invention is to react phosphate rock with an aqueous sulfuric acid solution in such proportion as to solubilize substantially all of the $P_2O_5$ content of the rock, the acid solution containing a substantial amount of at least one soluble salt of sodium, or potassium or a mixture of the same to repress the solubility of the fluorine content of the rock, then, after separating the solids from the solution, solubilizing and extracting the fluorine from the solids residue.

Fluorine and the compounds of fluorine are mainly obtained from the ore known as fluorspar, the principal constituent of which is calcium fluoride. Fluorine and the compounds of fluorine are also obtained as by products from certain operations involving ores or minerals which contain fluorine compounds as minor constituents. The manufacture of phosphoric acid and the manufacture of superphosphate by the acidulation of phosphate rock are examples of operations in which fluorine compounds are recovered as by products. In these latter instances, in processes heretofore known to us, the fluorine compounds are evolved as gases during the acidulation of the phosphate rock, or in subsequent treatment, and the gases are then absorbed in water or in some alkaline solution, and the fluorine compounds are subsequently recovered as salts or acids.

The increasing use of fluorine in a large variety of operations and products makes the collection of fluorine as a by product an economically desirable step whenever a recovery process is available. Since the fluorine content of phosphate rock is regarded as a valuable constituent, consideration has been given to its recovery in operations other than the treatment of phosphate rock with sulfuric acid in the manufacture of phosphoric acid and superphosphate.

When Florida land pebble phosphate rock is solubilized with sulfuric acid alone, as described in our copending application Serial No. 682,605, filed Sept. 9, 1957, about 40% and downward of the fluorine present in the phosphate rock remains in the gypsum cake, while only 10% or less, of the $P_2O_5$ present in the phosphate rock remains in the gypsum cake.

When Florida land pebble phosphate rock is solubilized with sulfuric acid in a medium containing certain salts of sodium, or potassium, or both, as described in our previously filed application Serial No. 649,309, filed March 29, 1957, about 85%, and upwards, of the fluorine present in the phosphate rock remains in the gypsum cake, while only 10%, or less, of the $P_2O_5$ present in the phosphate rock remains in the gypsum cake. In accordance with this process we first acidulate the phosphate rock as described in our previously filed application Serial No. 649,309, separate the phosphate solution from the gypsum cake formed in the acidulation, and then extract the fluorine from the gypsum cake.

*Example 1*

Referring to the accompanying drawing we show a flow sheet illustrating the preferred manner of carrying out our improved process, and indicating approximate yields. On the flow sheet, as a matter of convenience, the parts by weight of materials entering into the process are indicated as pounds, though any convenient unit of weight may obviously be employed. According to our process, 407 pounds of high grade Florida phosphate rock of the approximate analysis indicated is ground to a fineness where approximately 60–70% passes a 200 mesh screen. To this rock so ground is first preferably added a solution containing approximately 150 pounds of water containing approximately 7.2 pounds potassium chloride and 5.7 pounds sodium chloride. The solution is mixed with the rock until the rock is thoroughly moistened.

An aqueous solution of sulfuric acid containing 280 pounds $H_2SO_4$ (100%), 580 pounds of water, 27.7 pounds of potassium chloride, and 21.7 pounds of sodium chloride, which has been cooled to approximately 40° C. is then added over a period of from 20 to 45 minutes to the moistened phosphate rock and the mixture allowed to react for approximately 2 hours. The proportions given above may be varied somewhat but we have found that the solubilizing solution should contain from 280 to 400 parts of sulfuric acid to 1000 parts of water to form a filterable solution. Also there should be at least 0.6 parts mols of the alkali metal ion per 1000 parts of water in the solubilizing solution in order to obtain the best results. Also the solubilizing solution should contain approximately 2.06 parts by weight of $H_2SO_4$ to each part by weight of $P_2O_5$ in the phosphate rock. This amount is approximately 80% of that required to convert all the $P_2O_5$ in the rock to phosphoric acid and is sufficient to bring into water solution approximately 90% of the $P_2O_5$ in the rock. See Waggaman, Phosphoric Acid Phosphates and Phosphatic Fertilizers, Second Edition, page 216. During the solubilizing reaction the temperature of the mix may vary from 60° C. to 80° C. and preferably should not be allowed to rise above 80° C.

The solids are next separated from the solution, as by filtering, sufficient wash water being employed to extract substantially all soluble material. The filtrate will be found to contain approximately 90% of the $P_2O_5$ in the phosphate rock, 12 to 15% of the fluorine, together with around 75% of the potassium and 85% of the sodium employed in the solubilization. After recovery of the phosphate values from the solution as described in our previously filed application Serial No. 649,309 the solution may be employed with the sulfuric acid to solubilize a succeeding batch as is well understood.

The solids which have been separated from the solution, as just described (principally gypsum cake containing about 65% solids) will be found to contain approximately

| | Lbs. |
|---|---|
| $P_2O_5$ (10% of the 136# in the rock) | 14 |
| F. (85% of the 15.5# in the rock) | 13.2 |
| Na | 1–5 |
| K | 0.2–5 |

The solids are next placed in a suitable vessel where an extraction medium comprising liquid from a previous fluorine recovery cycle together with approximately 29 pounds $H_2SO_4$ is added to provide a liquid to solids ratio of approximately 2 to 1, or sufficient in amount to hold in solution the extractable fluorine compounds at the temperature of the extraction. Initially, however, a dilute solution of sulfuric acid is employed, which contains approximately 20 parts sulfuric acid to 1000 parts water, the sulfuric acid employed being, in any instance, approximately 2.2 pounds $H_2SO_4$ per pound of fluorine contained in the gypsum cake. Subsequent extractions are accomplished by recycling the extraction medium as just described. The sulfuric acid required to effect the solution of the fluorine content of the gypsum cake may be added either to the recycled extraction medium prior to mixing with the gypsum cake or may be added to the mixture of recycled extraction medium and gypsum cake.

The mixture of gypsum cake, extraction medium and sulfuric acid is heated for approximately one half hour at a temperature from 80° C. to the boiling point of the mix, preferably around 90° C. After the mixture has been heated as just described the liquid extraction medium containing the fluorine compounds extracted from the gypsum cake is separated from the residual solids in any convenient manner, as by filtration, and the residual solids are washed, preferably first with a small quantity of recycled extraction medium, and finally with water. The washed residual solids are then discarded.

After the fluorine containing extraction medium has been separated from the residual solids, the equivalent of from 2 to 3 pounds of silica in a reactive form, preferably as sodium silicate, or other water soluble silicate, preferably in solution, sufficient in amount to react with any fluorides that may be present, are added to the fluorine containing extraction medium to convert the fluoride content of the extraction medium to fluosilicate.

A soluble alkali metal salt or a mixture thereof is then added to the extraction medium sufficient in amount to react with and precipitate the major portion of the fluorine as the respective alkali metal fluosilicate. For example, from 3 to 7 pounds of potassium, as the nitrate, the chloride or the sulfate, or up to 3 pounds of sodium, as the nitrate, the chloride or the sulfate may be employed. As is well understood mixtures of these salts may be employed to provide the necessary alkali metal ions to react with the fluosilicates and form alkali metal fluosilicates, except that, as will be apparent, the nitrates and chlorides should not be used in combination. The solution is then cooled, the alkali metal fluosilicates crystallize and are separated from the solution in any convenient manner as by filtration, during which time they are washed, preferably with recycled extraction medium and finally with water. The fluosilicates thus recovered contain approximately 11 to 11.5 pounds of fluorine as sodium or potassium fluosilicates, which is more than 70% of the fluorine contained in the phosphate rock.

*Example 2*

Instead of employing a mixture of potassium chloride and sodium chloride in the acid solution employed for solubilizing the phosphate rock, we may employ potassium chloride or sodium chloride alone, and obtain results comparable to those set out in Example 1. When potassium chloride alone is employed a typical solubilizing procedure is as follows:

407.0 parts ground high grade Florida phosphate rock (33.5% $P_2O_5$)
280.0 parts $H_2SO_4$ as (288.7 parts 97% $H_2SO_4$)
730.0 parts water, total
34.9 parts potassium chloride Prior to the solubilization 7.2 parts of potassium chloride is dissolved in 150 parts of water, and then thoroughly mixed with the ground rock, 27.7 parts of potassium chloride is dissolved in the diluted and partly cooled acid.

The acid should be added to the rock-potassium chloride-water mixture at a uniform rate, over a period of about 20 to 45 minutes for complete addition. The mixture should be stirred vigorously during the addition of the acid, and the temperature of the mix may vary from 60° C. to 80° C. After the acid is added, the mixture may stand for 2 hours, and then be filtered. The filter cake is washed with water, to recover the soluble $P_2O_5$ and is then ready for processing as set forth in Example 1 to recover its fluorine content.

*Example 3*

Where sodium chloride alone is employed in the acid solution for solubilizing the phosphate rock a typical procedure would be as follows:

407.0 parts ground high grade Florida phosphate rock (33.5% $P_2O_5$)
280 parts $H_2SO_4$ (as 288.7 parts 97% $H_2SO_4$)
730 parts of water, total
27.4 parts NaCl Prior to solubilization, 5.7 parts of NaCl is dissolved in 150 parts of water, and is then thoroughly mixed with the ground rock. The acid is diluted with 580 parts of water, and is cooled, and 21.7 parts of NaCl are dissolved therein. The acid-salt solution is then added to the rock-NaCl-water mixture. The temperature of the final mixture may rise to about 60° C. to 80° C. The acid is added to the rock over a period of 20 to 45 minutes. A reacting time of 2 to 3 hours after the acid addition is sufficient for satisfactory solubilization of the $P_2O_5$. The solution is then filtered, the filter cake is washed with water to recover the soluble $P_2O_5$ and is then ready for processing as set forth in Example 1 to recover its fluorine content.

While we prefer to employ sodium and potassium chlorides, either alone or in combination, as set forth in the preceding examples, in the acid solution for solubilizing the phosphate rock, we may obtain satisfactory results using the nitrates, ortho-phosphates, or sulfates of sodium and potasisum, singly or in combination, except, as will be apparent, the nitrates and chlorides should not be used in combination. Whichever salt, or salts, is employed should provide at least 0.6 parts mols alkali metal ions per 1000 parts of water in the solution in order to obtain the best results.

From the foregoing it will be apparent that we have devised an improved process for recovering fluorine from phosphate rock which is simple and effective and by means of which the major portion of the fluorine values are recovered.

We wish it to be understood that we do not desire to be limited to the exact details of the process shown and described for obvious modifications will occur to a person skilled in the art.

What we claim is:

1. The method of recovering fluorine from high grade Florida phosphate rock which comprises acidulating at a temperature of from 60° to 80° C. the phosphate rock with an aqueous sulfuric acid solution in an amount substantially 80% of that required to convert all the $P_2O_5$ in the rock to $H_3PO_4$, together with at least one added alkali metal salt selected from the group consisting of the nitrates, the chlorides, the sulfates and the orthophosphates of potassium and sodium in amount sufficient to provide at least 0.6 part mols of alkali metal ion per 1000 parts water in the solubilizing solution, said acid solution containing sufficient water to produce a filterable phosphate solution, separating the resulting solids which contain the major portion of the fluorine content of the phosphate rock from the phosphate solution, washing the solids to remove soluble $P_2O_5$, mixing the solids with an aqueous extraction medium containing 2.2 parts sulfuric acid to each part fluorine in the solids to solubilize their fluoride content, heating the mixture of solids and extraction medium to a temperature of from 80° C. to its boiling point, separating the extraction medium from the solids and cooling it to a temperature of approximately 30° C., introducing an alkali metal silicate solution into the extraction medium to react with the fluoride therein and form fluosilicates, introducing into the extraction medium at least one alkali metal salt selected from the group consisting of the chlorides and the sulfates of sodium and potassium to react with the fluosilicates and form and precipitate alkali metal fluosilicates, and separating the alkali metal fluosilicates from the extraction medium.

2. The process defined in claim 1 in which the extraction medium from the last mentioned separation is returned to dilute the acid and form the extraction medium employed to solubilize the fluorine compounds in the solids derived from solubilizing the phosphate rock.

3. The method of recovering fluorine from high grade Florida phosphate rock which comprises reacting the phosphate rock at a temperature of from 60° to 80° C. with an aqueous sulfuric acid solution containing approximately 2.06 parts by weight $H_2SO_4$ per part by weight $P_2O_5$ in the rock and from 280 to 400 parts by weight of $H_2SO_4$ to 1000 parts of water, together with at least one added alkali metal salt selected from the group consisting of the nitrates, the chlorides, the sulfates and the orthophosphates of potassium and sodium in amount sufficient to provide at least 0.6 part mols of alkali metal ions per 1000 parts of water in the solubilizing solution, separating the solids which contain the major portion of the fluorine content of the phosphate rock from the solution thus formed, washing the solids to free them from soluble $P_2O_5$, mixing the solids with an extraction medium comprising an aqueous solution of sulfuric acid containing approximately 2.2 parts $H_2SO_4$ to each part fluorine in the solids to react with the fluorides in the solids and containing approximately 20 parts sulfuric acid per 1000 parts of water, heating the mixture to a temperature of from 80° C. to its boiling point, separating solids from the extraction medium, cooling the extraction medium to approximately 30° C., introducing a sodium silicate solution into the extraction medium to react with the fluorides therein and form fluosilicates, introducing into the solution at least one alkali metal salt selected from the group consisting of the nitrates, the chlorides and sulfates of sodium and potassium in amount sufficient to react with the fluosilicates in the solution and precipitate them as alkali metal fluosilicates, and separating the said alkali metal fluosilicates from the extraction medium.

4. The process defined in claim 3 in which a mixture of potassium chloride and sodium chloride is mixed with the acid solution employed to acidulate the phosphate rock.

5. The process defined in claim 4 in which the phosphate rock is first mixed with a solution formed with a portion of the water and a portion of the alakali metal salts until thoroughly moistened, and then reacted with the aqueous sulfuric acid solution containing the remainder of the alkali metal salt and water.

References Cited in the file of this patent

UNITED STATES PATENTS

| | | |
|---|---|---|
| 1,756,637 | Edwards | Apr. 29, 1930 |
| 1,788,828 | Goldberg et al. | Jan. 13, 1931 |
| 2,447,359 | Oakley | Aug. 17, 1948 |
| 2,783,139 | Datin | Feb. 26, 1957 |